United States Patent [19]

Kunert

[11] Patent Number: 4,910,071
[45] Date of Patent: Mar. 20, 1990

[54] AUTOMOBILE GLAZING INTENDED FOR DIRECT GLUING

[75] Inventor: Heinz Kunert, Cologne, Fed. Rep. of Germany

[73] Assignee: Saint-Gobain Vitrage, Courbevoie, France

[21] Appl. No.: 242,764

[22] Filed: Sep. 9, 1988

[30] Foreign Application Priority Data

Sep. 10, 1987 [DE] Fed. Rep. of Germany ....... 3730344

[51] Int. Cl.$^4$ ........................... B60J 1/02; B32B 23/02
[52] U.S. Cl. .................................... 428/192; 156/108;
52/171; 296/84.1; 296/96.21; 428/38; 428/81;
428/105; 428/119; 428/120; 428/156; 428/167;
428/172; 428/200; 428/203; 428/206; 428/210;
428/343; 428/354; 428/425.6; 428/426
[58] Field of Search ............... 428/200, 192, 195, 203,
428/38, 542.8, 343, 354, 426, 210, 425.6, 80, 81,
83, 88, 92, 94, 99, 122, 157, 156, 105, 113, 114,
119, 120, 167, 172, 201, 206, 207, 353, 346, 347,
349; 296/84.1, 96.21, 200; 156/108, 500;
52/171, 788, 823

[56] References Cited

U.S. PATENT DOCUMENTS

| 4,405,174 | 9/1983 | Yamane et al. | 296/201 |
| 4,481,701 | 11/1984 | Hewitt | 29/453 |
| 4,546,723 | 10/1985 | Leopold et al. | 156/109 |
| 4,551,372 | 11/1985 | Kunert | 428/38 |
| 4,571,278 | 2/1986 | Kunert | 52/208 |
| 4,581,276 | 4/1986 | Kunert et al. | 428/43 |
| 4,582,738 | 4/1986 | Kunert | 428/122 |
| 4,775,570 | 10/1988 | Offlenforst et al. | 428/122 |

FOREIGN PATENT DOCUMENTS

| 157281 | 3/1985 | European Pat. Off. . |
| 3536806 | 10/1985 | Fed. Rep. of Germany . |
| 1546011 | 5/1979 | United Kingdom . |

Primary Examiner—Ellis P. Robinson
Assistant Examiner—Donald J. Loney
Attorney, Agent, or Firm—Pennie & Edmonds

[57] ABSTRACT

An automobile glazing (1,7) is equipped with one or two profile barriers (2; 9,10; 12,13; 20,21) which are used to impede the expansion of a bead of glue that secures the glazing to the fastening metal sheet of a window opening of an automobile body. The profile barriers comprise a setting adhesive mass that has been deposited on an opaque layer 5 to which it adheres. The profile barriers are deposited on the immediate periphery of the glazing by extrusion of the viscous adhesive mass.

16 Claims, 2 Drawing Sheets

FIG. 3
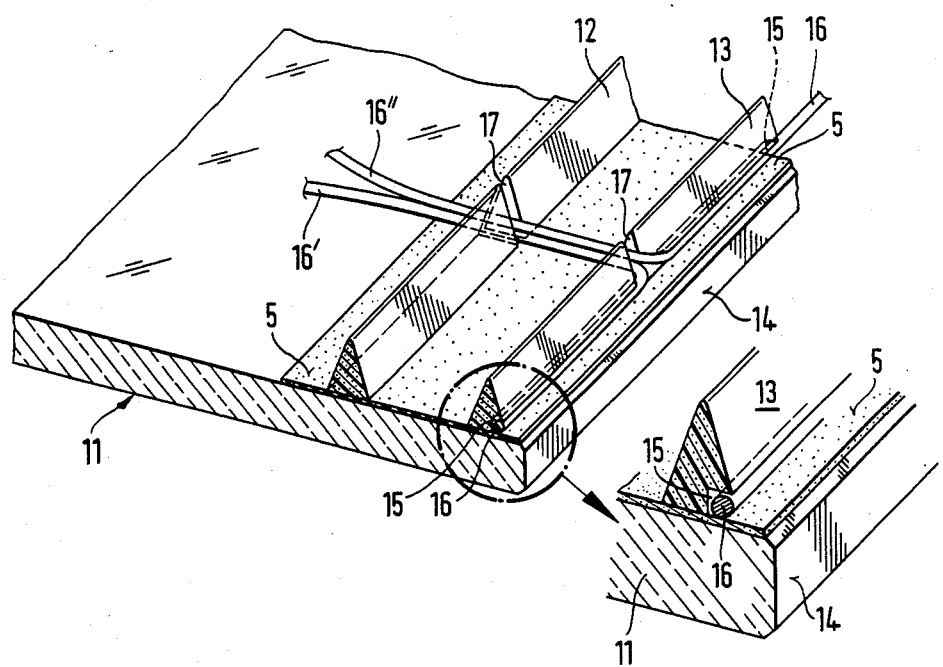
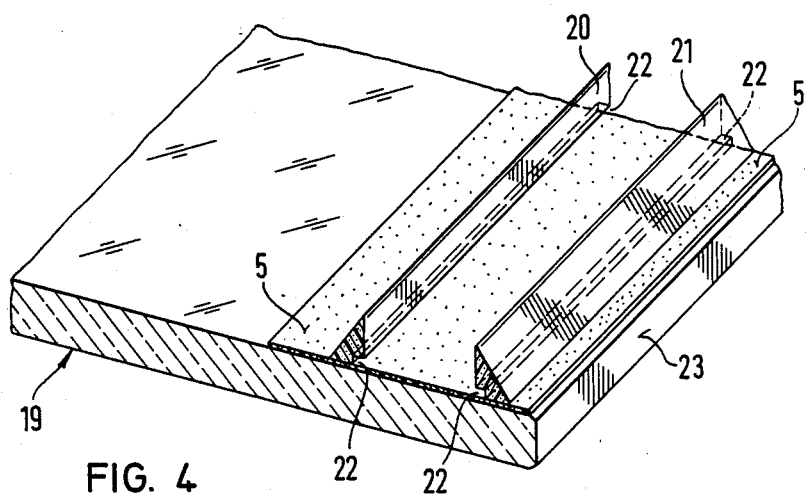
FIG. 4

AUTOMOBILE GLAZING INTENDED FOR DIRECT GLUING

This invention relates to an automobile glazing that is intended for direct gluing onto a fastening sheet metal member in a window opening of an automobile body. The automobile glazing is equipped with at least one preformed profile barrier by depositing an adhesive parallel to the edge of the glazing and allowing it to harden. The profile barrier has approximately the same height as a bead of glue that is used to mount the glazing in the opening. As a result, the barrier holds the bead of glue in place at the time the glazing is mounted in the opening and impedes expansion of the bead beyond the barrier.

In a known installation method, a prefabricated barrier (for example, a barrier made of rubber) is placed between the glazing and the fastening sheet metal member of the automobile. See West German Patent Application DE 31 18 124 A1, European Patent Application EP 157 281 A2. The gluing of such a prefabricated barrier onto the glazing prior to its mounting into its bay requires the glazing to be handled ith extreme care to avoid loosening the barrier. Additional time is also required since the glazing must be held immobile and the mounting process cannot begin until the glue has completely set.

In another configuration, an automobile glazing is equipped with preformed profile barriers made of rubber or plastic which have two parallel lateral wings connected to one another by a crosspiece. See West German Patent Application DE 35 36 806 A1. Again, this barrier is glued to the glazing. However, the mounting and the gluing of these preformed profile barriers is still more delicate especially in the corner areas. Thus, installation methods implementing prefabricated barriers possess a number of difficulties since their mounting and handling require prolonged and delicate procedures.

The prior art also discloses a process for bonding the glazing to the fastening sheet metal member of the bay or opening where two compatible beads are deposited during two successive production phases. In the first phase, a contoured bead is deposited on the periphery of the windshield and allowed to harden. In the second phase, this contoured bead acts as a rigid interlayer between the glass and a second bead of adhesive mass. See U.S. Pat. No. 4,571,278. The rigid interlayer can optionally be equipped with wings to impede the expansion of the second bead during the mounting process. Since the contoured bead consists of both a base parallel to the glazing acting as the interlayer, and barriers perpendicular to the glazing, difficulties can arise when the adhesion of the adhesive composition of the second bead to the interlayer of the hardened adhesive material is lower than the adhesion to the glazing surface or to another layer on the glazing.

It is an object of this invention to improve the production of glazings equipped with preformed profile barriers. In particular, it is an object of this invention to simplify the production of such glazings and to assure a bond between the profile barrier and the surface of the glass that lasts for a longer period of time. Finally, it is an object of this invention to provide a preformed profile barrier that can be placed in the corners of the glazing at small radius without folding and without being placed under stress. This will permit a perfect mounting of the glazing into the automobile bay.

SUMMARY OF THE INVENTION

In the present invention, I have devised a profile barrier that can be applied before the actual mounting process and is rigid and durable such that no extra care is necessary when handling the prepared glazing. Also, since the barrier is extruded of a viscous adhesive material on the glazing surface, no difficulties arise due to crimping or folding when the profile barriers are applied around corners.

The profile barrier comprises a setting adhesive mass which is deposited on the glazing by extrusion of a viscous adhesive mass around the periphery of the edge of the glazing. Since the profile barrier is not preformed but rather is formed directly on the glazing, any desired shape can be formed precisely, even when the radii of curvature that must be achieved is very small as is required in the corners of the glazing. Furthermore, since the adhesive mass is deposited on the glazing without stress, there are no forces in the adhesive mass which could shift its position between the time it is deposited and the time it sets. The adhesive masses which will be selected for the profile barrier should preferably have an elasticity comparable to that of rubber after they set. Suitable materials are single-component or bi-component polyurethanes.

In order to maximize the bond between the glazing and the fastening sheet metal, materials are chosen as the adhesive mass for the profile barrier that are compatible with those which constitute the bead of glue used to mount the glazing. This provides an immediate bond between the bead of glue and the profile barrier which will result in an overall improvement in mounting.

In another embodiment of the invention, the bond between the bead of glue applied during mounting and the profile barrier is enhanced by mechanical interlocking. Grooves or housings are provided in the profile barrier which are penetrated by the bead of glue, thereby increasing the strength of the bond.

BRIEF DESCRIPTION OF THE DRAWINGS

These and other objects, features, and advantages of the present invention will be more readily apparent from the following detailed description of a preferred embodiment of the invention in which:

FIG. 3 depicts a third illustrative embodiment of this invention.

FIG. 4 depicts a fourth illustrative embodiment of this invention.

DETAILED DESCRIPTION OF PREFERRED EMBODIMENT

Figure 1:
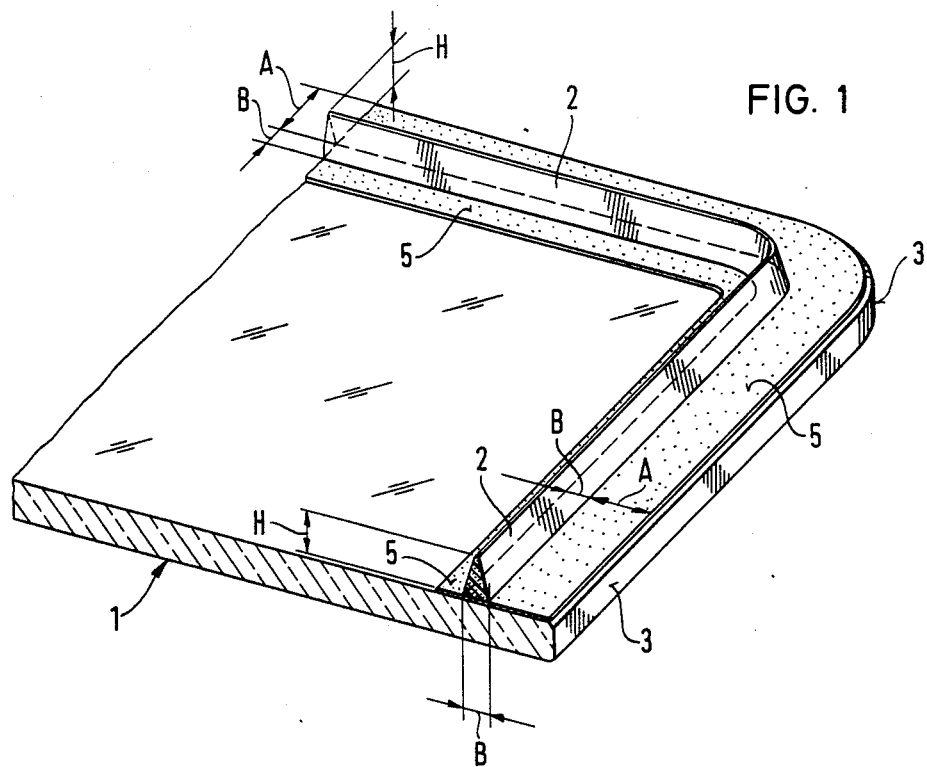
FIG. 1 depicts a first illustrative embodiment of the invention in which one profile barrier has been affixed to the periphery of the glazing.

The example presented in FIG. 1 comprises a glazing 1 with a single profile barrier 2. Glazing 1 is either a tempered glazing or a laminated glazing. Normally, the glazing's shape corresponds to that of the bay of a vehicle body. Barrier 2 is at a distance A from an edge 3 of the glazing and runs parallel to it. Along the edge of the glazing there is a layer 5 generally comprising a hot setting paint or a enamel that is opaque to visible and ultraviolet light. Layer 5 is applied on the surface of the glazing which is mounted so as to be directed toward the inside of the car, i.e., normally on the concave side.

As shown in FIG. 1, barrier 2 is deposited on frame shaped layer 5. It has a height H generally between 8 and 12 mm. This height H corresponds approximately to the thickness of the bead of glue which is used to fasten glazing 1 to the fastening sheet metal. The preferred cross section of profile barrier 2 is a triangle whose base is glued to the surface of layer 5. This base B has a width of approximately 5 to 8 mm.

Polyurethanes are particularly suited as the type of adhesive mass used to form the profile barrier because they exhibit, after setting, an elasticity similar to that of rubber. Examples include the single-component systems which set in moisture as described in U.S. Pat. No. 3,779,774 as well as two component systems. The adhesive mass has a high viscosity and thus retains its shape after extrusion. The adhesive mass is placed on the surface of the glazing 1 or layer 5 by a calibrated extrusion nozzle of suitable shape which can be guided, for example, by a programmable robot or by hand. In the latter case, a guiding device is used to guide the nozzle so that it follows along edge 3 of the glazing.

Figure 2:
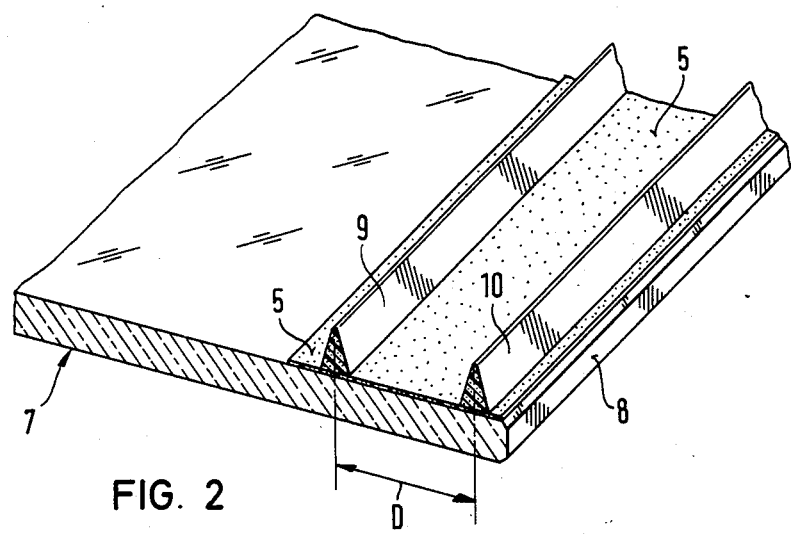
FIG. 2 depicts a second illustrative embodiment of this invention.

FIG. 2 depicts a glazing 7 with periphery 8 along which two profile barriers 9 and 10 run. The two barriers 9 and 10 are placed parallel to one another separated by a distance D of approximately 15 to 25 mm. Barriers 9 and 10 have cross sections of the same triangular shape and size as that of barrier 2 in FIG. 1. As in FIG. 1, the glazing of FIG. 2 also contains layer 5 which is opaque to light and ultraviolet rays. The two profile barriers are placed on layer 5 with the optional interposition of a layer of adherence primer. After setting, the two barriers constitute the sides of a channel in which a bead of glue will be introduced during the mounting of the glazing. Note that the barriers 9 and 10 only limit the side of the bead and that no part of the barrier will be between the bead and layer 5. Rather the base of the bead of glue is in direct contact with layer 5. This avoids the difficulty of folding and crimping that arises when a flat ribbon-like interlayer must be bent around small radii of curvature as in the corners of the glazing.

FIG. 3 comprises a glazing 11 equipped again with two profile barriers 12 and 13 but in this embodiment, outside barrier 13 performs an additional function. A groove 15 is provided along the entire length of the base surface of barrier 13 on the side closest to the edge of the glazing. Illustratively, the groove has the following dimensions: height approximately 2 mm and width approximately 2 to 3 mm. Groove 14 is produced by adjusting the extrusion nozzle to the appropriate shape. After profile barrier 13 has finished setting, a thread or wire 16 is inserted into groove 15 along its entire length. The thread or wire is a material of high tensile strength which may, for example, be a textile, or a synthetic material. A beginning 16' and an end 16" of thread or wire 16 pass together through slots 17 in profile barriers 12 and 13 which are provided for just this purpose. By installing thread or wire 16 into automobile glazing 11, removal of the glazing is simplified if it later becomes necessary to remove the windshield from its bay. As described in greater detail in U.S. Pat. No. 4 581 276, profile barriers 12 and 13 along with the bead of glue which they frame can be torn by pulling ends 16' and 16".

In FIG. 4, glazing 19 is again equipped with an opaque layer 5 on which are placed two profile barriers 20 and 21 which are parallel to one another and are located at constant distances from edge 23 of the glazing. The channel defined by the two barriers 20 and 21 will be filled with a bead of glue just before the windshield is mounted into its bay. In this embodiment, each of the two profile barriers 20 and 21 is formed with a groove or housing 22 at its base on the side of the channel. During the mounting of the windshield, the bead of glue will penetrate into these grooves and harden. This will strengthen the bond since this bond consists of both the gluing and a mechanical interlocking.

Alternatively, by adjusting the coefficient of adhesion between the bead of glue on the one hand and layer 5 and the profile barriers on the other, the adhesive properties can be minimized so that the glue is bonded to the glazing essentially by mechanical interlocking within grooves 22. This type of mounting is advantageous in applications where it is desirable to remove the glazing more readily.

What is claimed is:

1. An automobile glazing intended for direct gluing onto a fastening sheet metal member comprising:
    a glazing having an outer edge;
    at least one profile barrier formed by a settable adhesive mass extruded onto one surface of said glazing parallel to said outer edge, each said barrier at a predetermined distance from said outer edge; and
    a bead of glue deposited directly onto said surface of said glazing such that said bead also contacts each of said profile barriers, wherein said profile barriers impede the expansion of said bead of glue.

2. The automobile glazing according to claim 1 wherein the profile barrier has a cross-section in the shape of a triangle.

3. The automobile glazing according to claim 1 wherein the profile barrier comprises a viscous adhesive mass compatible with said bead of glue to which said barrier adheres.

4. The automobile glazing according to claim 1 wherein said profile barrier is provided with a surface having a groove therein to form a mechanical linkage between the barrier and said glue following application of said glue.

5. The automobile glazing according to claim 1 wherein each of said profile barriers has a channel side and an outer side, said channel side of each barrier having a groove therein to form a mechanical linkage between each barrier and said glue following application of the glue.

6. The automobile glazing according to claim 5 wherein the coefficients of adhesion of said bead of glue, said profile barriers and said glazing are such that said glue is bonded to said glazing and said barriers essentially by the mechanical linkage between the glue and the groove in each barrier.

7. The automobile glazing according to claim 1 wherein at least one of said profile barriers is provided with a surface having a groove wherein at least one wire of a material with high tensile strength is positioned in said groove after said barrier is extruded and finished setting so that it can later be used to remove the glazing from a window opening.

8. The glazing of claim 1 wherein each of said profile barriers comprises a viscous adhesive mass.

9. The glazing of claim 1 wherein each of said profile barriers has a triangular cross-section.

10. The glazing of claim 9 wherein at least one of said profile barriers is provided with a surface having a groove wherein at least one wire of a material having high tensile strength is positioned in said groove after said barriers have been extruded and have finished setting so that said wire can be used to facilitate removal of said glazing from a window opening.

11. An automobile glazing intended for direct gluing onto a fastening sheet metal member comprising:
   a glazing having an outer edge;
   an opaque layer coated onto one surface of said glazing at said outer edge;
   at least one profile barrier formed by a settable adhesive mass extruded onto said opaque layer parallel to said outer edge, each said barrier at a predetermined distance from said outer edge; and
   a bead of glue deposited directly onto said opaque layer such that said bead also contacts each of said profile barriers, wherein said profile barriers impede the expansion of said bead of glue.

12. The glazing of claim 11 wherein said opaque layer comprises an enamel.

13. The glazing of claim 11 wherein the opaque layer comprises a hot setting paint.

14. The glazing of claim 11 wherein each of said profile barriers comprises a viscous adhesive mass.

15. The glazing of claim 11 wherein each of said profile barriers has a triangular cross-section.

16. The glazing of claim 15 wherein at least one of said profile barriers is provided with a surface having a groove wherein at least one wire of a material having high tensile strength is positioned in said groove after said barriers have been extruded and have finished setting so that said wire can be used to facilitate removal of said glazing from a window opening.

* * * * *